(12) United States Patent
Krishnan et al.

(10) Patent No.: US 8,369,344 B1
(45) Date of Patent: Feb. 5, 2013

(54) CUSTOMER ISOLATION USING A COMMON FORWARDING DATABASE WITH HARDWARE LEARNING SUPPORT

(75) Inventors: Ram Krishnan, Sunnyvale, CA (US); Piya Chindaphorn, San Jose, CA (US)

(73) Assignee: Extreme Networks, Inc., Santa Clara, CA (US)

(*) Notice: Subject to any disclaimer, the term of this patent is extended or adjusted under 35 U.S.C. 154(b) by 488 days.

(21) Appl. No.: 12/406,776

(22) Filed: Mar. 18, 2009

(51) Int. Cl.
*H04L 12/28* (2006.01)
*H04L 12/56* (2006.01)

(52) U.S. Cl. .................. 370/395.53; 370/389

(58) Field of Classification Search ............. 370/395.53, 370/389
See application file for complete search history.

(56) References Cited

U.S. PATENT DOCUMENTS

| | | | | |
|---|---|---|---|---|
| 6,741,592 | B1* | 5/2004 | Edsall et al. | 370/389 |
| 7,095,741 | B1* | 8/2006 | Joshi et al. | 370/392 |
| 7,574,494 | B1* | 8/2009 | Mayernick et al. | 709/222 |
| 7,710,959 | B2* | 5/2010 | Ramasamy et al. | 370/389 |
| 2003/0072309 | A1* | 4/2003 | Watanabe et al. | 370/392 |
| 2003/0225907 | A1* | 12/2003 | Krishnan | 709/238 |
| 2004/0190506 | A1* | 9/2004 | Davis et al. | 370/389 |
| 2006/0146835 | A1* | 7/2006 | Homchaudhuri et al. | 370/395.53 |
| 2007/0177527 | A1* | 8/2007 | Bragg et al. | 370/256 |

OTHER PUBLICATIONS

Cisco, IOS Release 12.2(25)SEE; Jan. 2006; Text Part Number: OL-8550-01; Chapter 16; full document at http://www.cisco.com/en/US/docs/switches/lan/catalyst3750/software/release/12.2_25see/configuration/guide/3750SCG.pdf; retrieved on Oct. 7, 2010; title pg, pp. iii-xl , pp. 16-1 to 16-16); 56 pgs.

* cited by examiner

*Primary Examiner* — Ayaz Sheikh
*Assistant Examiner* — Tarell Hampton
(74) *Attorney, Agent, or Firm* — Blakely Sokoloff Taylor & Zafman LLP

(57) ABSTRACT

A network switch includes a plurality of isolated ports, each associated with a private domain. The switch also includes a network port associated with the private domain. A memory in the switch maintains a hardware-based forwarding table for the private domain. Processing logic in the network switch prevents forwarding of packets between isolated ports within the private domain based at least in part on a privacy level associated with each entry in the hardware-based forwarding table for the private domain.

19 Claims, 2 Drawing Sheets

CUSTOMER ISOLATION USING A COMMON FORWARDING DATABASE WITH HARDWARE LEARNING SUPPORT

FIELD

Embodiments described herein relate to packet forwarding in private virtual local area networks.

BACKGROUND

A private virtual local area network (VLAN) includes switch ports that cannot communicate with each other but can access another network. These ports are called private ports. Each private VLAN contains one or more private ports and a single uplink port (or network port). A typical application of a private VLAN is in a hotel where each room has a different port that connects to or can access the Internet. In this situation, it is undesirable to allow communication between rooms, hence the use of the private VLAN.

A traditional private VLAN implementation has separate forwarding databases for network VLANs, isolated subscriber VLANs, and non-isolated subscriber VLANs. This traditional forwarding database setup causes a scaling issue. For example, a switch (e.g., a network switch) that is configured with a private VLAN domain will have a plurality of ports. Each port on the network switch may be connected to a different VLAN, necessitating a separate forwarding database for forwarding packets. Private VLANs can prevent packets originating from an isolated subscriber VLAN from being forwarded on a port associated with another isolated subscriber VLAN. To accomplish this, a single forwarding entry must be duplicated on each separate forwarding database for each port in to cover all of the different forwarding scenarios. Given that each port needs its own forwarding database, as the number of ports increase on a network switch, the complexity and the number of forwarding entries that are duplicated also increase.

To satisfy traditional private VLAN forwarding domain rules, the learning forwarding database entries are software driven. This has a direct impact on the forwarding database learning rate. For example, it is common for a software learning rate to be about 5,000 entries per second. In contrast, hardware learning rates can achieve or exceed 100,000 entries per second. Because of the necessity of replicating forwarding database entries in traditional private VLAN domains, it is not cost effective to learn forwarding database entries in hardware. The replication of entries wastes hardware space.

SUMMARY OF THE DESCRIPTION

A network switch having a private domain is described herein. The network switch includes a plurality of isolated ports, each of which is associated with the private domain. The network switch also includes a network port that is associated with the private domain. Additionally, a network switch includes a memory that maintains a hardware-based forwarding table for the entire private domain. A network processor is also included to prevent forwarding of packets between isolated ports within the private domain based at least in part on a privacy level associated with each entry in the hardware base forwarding table for the private domain.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

As provided herein, methods, apparatuses, and systems enable forwarding of data traffic on a network switch having a private VLAN domain configured. As used herein, a network switch refers to any network device that facilitates traffic flow or data packet flow on a network. Network switches can include, for example, Open Systems Interconnection (OSI) layer 2 bridges, layer 3 switches (or "routers"), and other known routing/forwarding devices.

Embodiments described herein conform to a rule that requires that packets not be forwarded between isolated ports on the same switch. Whereas traditional private VLAN implementations require duplication of forwarding entries for each of a plurality of VLAN types (each VLAN type—isolated VLAN, network VLAN, etc. having a respective forwarding database), embodiments described herein include a hardware-based forwarding database (or forwarding table) that allows all forwarding entries to be stored in hardware. A forwarding table includes a collection of forwarding entries indicating, for example, an egress port for a given destination address. As used herein, a forwarding database may also be referred to, for example, as a forwarding table or a routing table.

In various embodiments, a network switch may have multiple domains but at least one private VLAN domain programmed on the switch.

Figure 1:
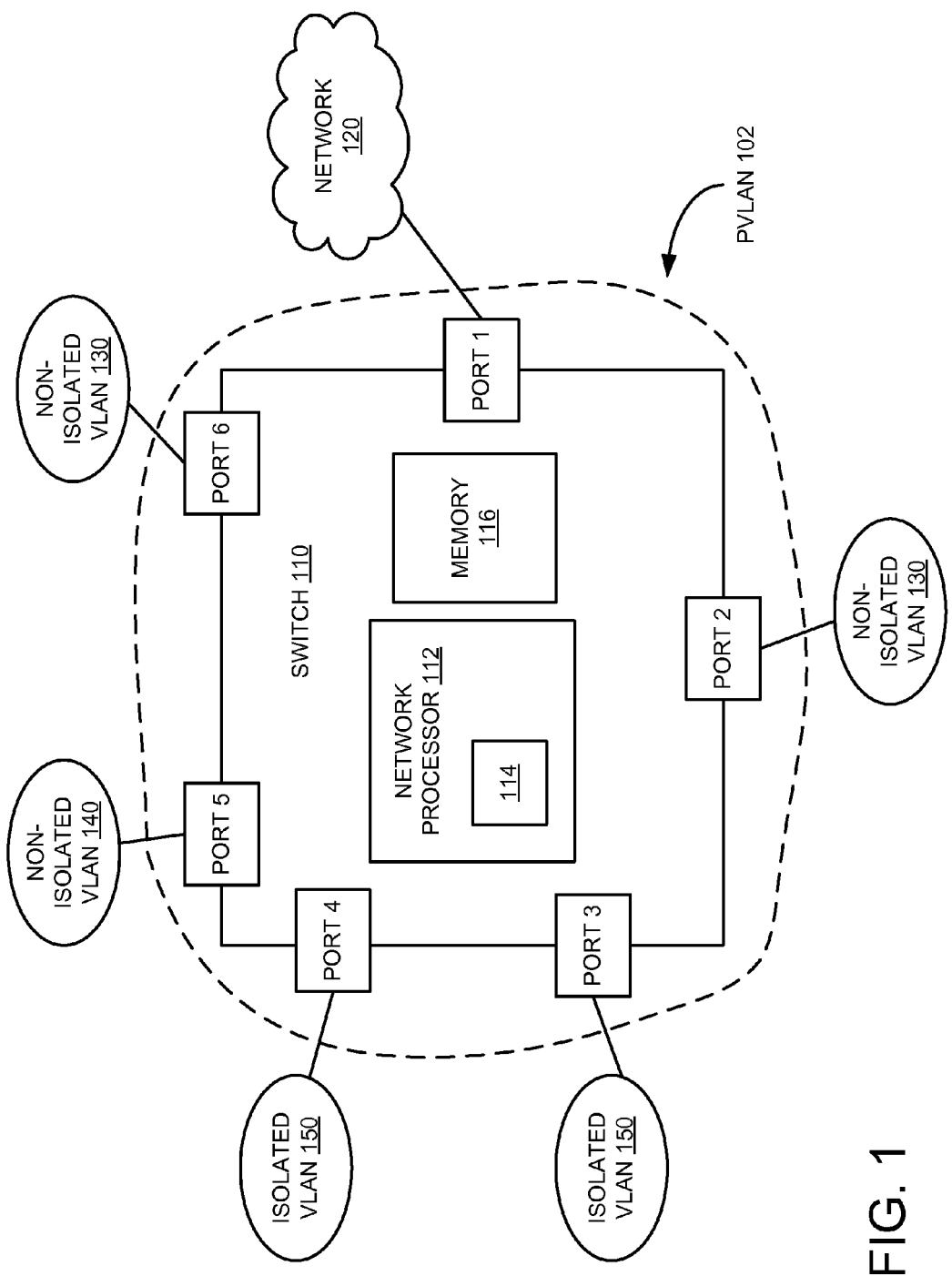
FIG. 1 is a block diagram illustrating a system according to various embodiments.

FIG. 1 is a block diagram according to various embodiments. As shown, switch 110 includes a network processor 112, a memory 116, and a plurality of ports. The network processor 112 could be replaced by an application specific integrated circuit (ASIC) or other programming logic in alternate embodiments. Additionally, while six ports are shown in FIG. 1, one of skill in the art will appreciate that more ports or fewer ports could be used in different embodiments. At least some of the ports on switch 110 are considered isolated ports. For example, ports 3 and 4 are isolated ports given that they are each connected to isolated VLAN 150. Ports 2, 5 and 6 are considered non-isolated ports. Ports 2 and 6 are connected to the same non-isolated VLAN 130, while port 5 is connected to a separate non-isolated VLAN 140. Port 1 is considered a network port because it is connected to network 120. All of the ports shown in FIG. 1 on switch 110 are encompassed by or belong to private VLAN domain 102.

In various embodiments, an individual port can be associated with multiple private VLAN domains. For example, port 1 could be an isolated port (e.g., connected to an isolated VLAN) for a first private VLAN domain and a non-isolated port (e.g., connected to a non-isolated VLAN) for a second private VLAN domain. Within a single private VLAN domain, the ports described in various embodiments herein are connected to a single VLAN type within the private VLAN domain.

Memory 116 maintains a hardware-based forwarding table for the private VLAN domain. Unlike traditional private VLAN domain forwarding tables where a separate forwarding table is maintained for each different type of VLAN (e.g., network VLAN, isolated subscriber VLAN, non-isolated subscriber VLAN, etc.), memory 116 maintains a hardware-based forwarding table for the private VLAN domain 102. This hardware-based forwarding table maintains entries for all ports within private VLAN domain 102 to eliminate replication of forwarding database entries. In other words, it is not necessary to have a separate forwarding table for each different VLAN and/or port within the private VLAN domain.

By consolidating all forwarding entries into a single hardware-based forwarding table, the absence of forwarding entry replication enables the use of a hardware forwarding table. As discussed previously, hardware-based forwarding tables have a much higher learning rate (e.g., 100,000 entries per second) than multiple software forwarding tables.

Network processor 112 prevents forwarding of packets between isolated ports within the private VLAN domain 102 based at least in part on a privacy level associated with each entry in the hardware-based forwarding table maintained in memory 116. (As noted above, other types of processing logic, such as an ASIC, firmware, etc. could be used in place of a network processor.) For example, network processor 112 would prevent packets arriving at port 3 from being forwarded out on port 4 given that both ports are attached to isolated VLAN 150 and in view of the rule that packets cannot be exchanged between isolated ports. Network processor 112 includes a gatekeeper 114 to help enforce this rule. Specifically, gatekeeper 114 receives packets from the various ports on the switch and determines an egress port privacy level for the packet. Gatekeeper 114 also determines an ingress port privacy level for the packet in various embodiments.

The privacy level in each forwarding entry in the forwarding table stored in memory 116 is determined by two privacy bits (although a different number of bits could be used in other embodiments). Thus, when a packet is received by switch 110, the header of the packet is checked to determine the value of the two privacy bits. The privacy bits are then compared with the corresponding forwarding entry for that packet (stored in memory 116). If the privacy bits indicate that either the ingress port privacy level or the egress port privacy level is associated with an isolated port, then that packet will not be forwarded out on switch 110 unless one of the two ports is a network port.

For example, if gatekeeper 114 determines that a packet was received from an isolated port (e.g., port 3) and gatekeeper 114 determines that the egress port privacy level for the outgoing port (e.g., port 4) is indicative of another isolated port, then that packet will not be forwarded (e.g., the packet will be blocked, filtered, dropped, etc.). If, however, a packet is received at an isolated port (e.g., port 3) and gatekeeper 114 determines that the egress port privacy level is indicative of a network port (e.g., port 1) then the packet will be forwarded out on the egress port.

Another way of looking at it is that if either the ingress port or the egress port is a network port (e.g., port 1 as shown in FIG. 1), then the packet will always be forwarded because at least one of the ports is a network port (connected to network 120).

Forwarding packets between non-isolated ports presents a different scenario. Packets may be forwarded through switch 110 on the same non-isolated VLAN. For example, if a packet is received from a non-isolated VLAN (e.g., VLAN 130 on port 2) and that packet has a destination address that requires forwarding the packet through switch 110 on port 6 (also connected to non-isolated VLAN 130), then gatekeeper 114 may allow the packet to be forwarded to its destination. However, in cases where gatekeeper 114 determines that both the ingress port and the egress port are associated with different non-isolated VLANs (e.g., ingress port is port 2 connected to VLAN 130 while the egress port is port 5 connected to VLAN 140), then gatekeeper 114 will prevent the packet from being forwarded on switch 110 (e.g., by blocking, filtering, dropping the packet, etc.). As discussed previously, the forwarding actions of gatekeeper 114 are determined based on the privacy bits contained in the packet header of the packet to be forwarded and comparing the privacy bits with an appropriate forwarding entry.

In some embodiments, the packet header includes the privacy bits for the ingress port or the egress port or both. For example, if the privacy check is performed on packet ingress, only the egress privacy bits may be necessary. If, in another example, if the privacy check is performed on packet egress, both ingress and egress privacy bits might be used in packets.

Figure 2:
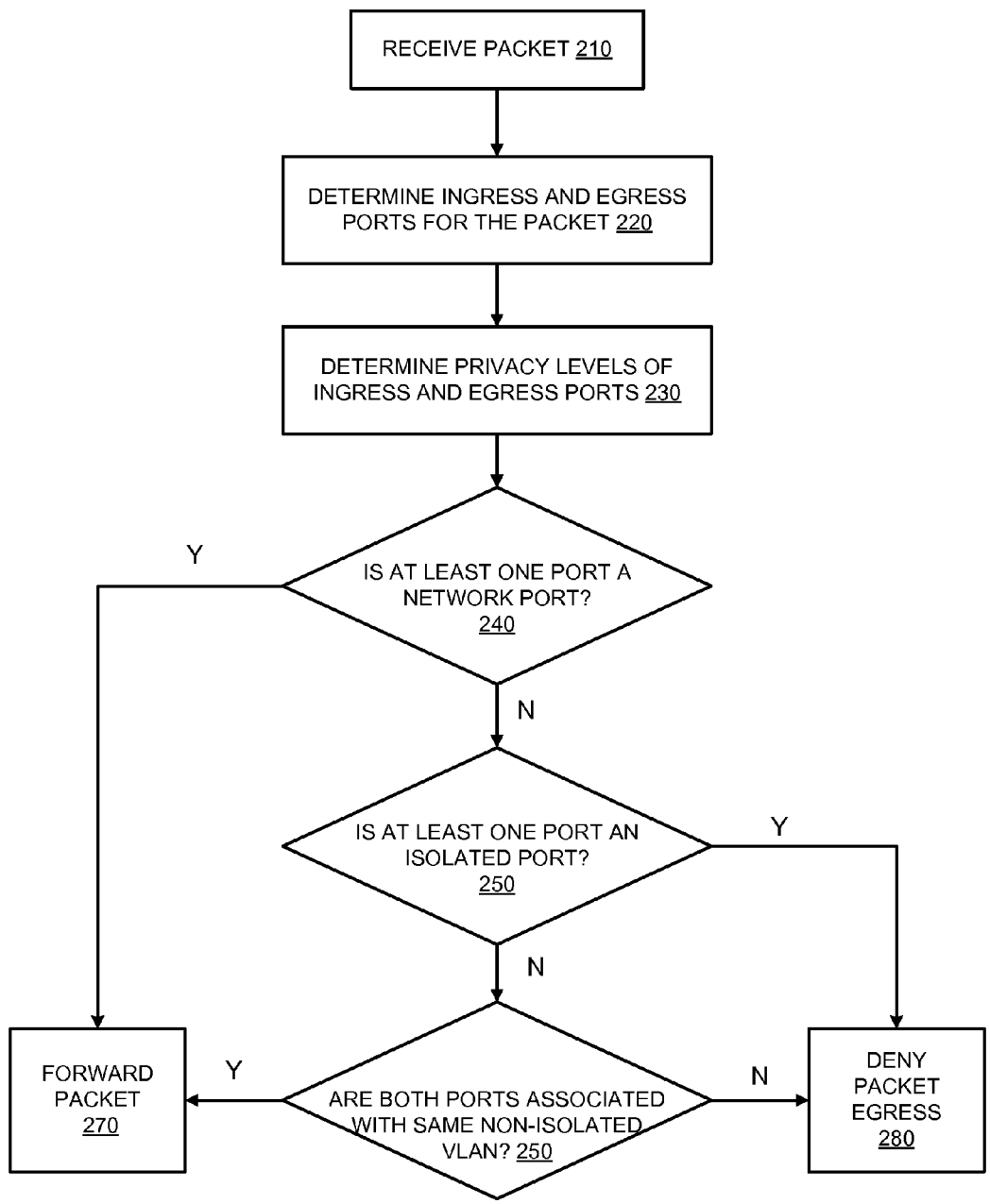
FIG. 2 is a flow diagram of operation in a system according to various embodiments.

FIG. 2 is a flow diagram illustrating various embodiments. A packet is received at a network switch 210. The network switch belongs to a private virtual local area network (or private VLAN) domain. Ingress and egress ports for the packet are determined 220. The ingress port is the port on which the packet is received by the switch while the egress port is the port from which the packet is to be forwarded from the network switch. Based on the ingress and egress ports of the packet, a table look up is performed 230 to determine the privacy levels of the ingress and egress ports. In various embodiments, the table lookup is performed by accessing a hardware-based forwarding table in a memory (random access memory, content addressable memory, flash memory, etc.).

Each packet header includes one or more bits dedicated to indicating a privacy level of the ingress port. Using the destination address to access the appropriate forwarding entry in the forwarding database, the privacy bit(s) for the egress port may also be determined. For example, if two privacy bits are used, "00" might indicate a non-private VLAN, "01" might indicate a network VLAN, "10" might indicated a non-isolated subscriber VLAN, and "11" might indicate an isolated subscriber VLAN.

Based on the privacy bits, it is determined 240 whether one of the two ports (i.e., either the ingress or the egress port) is a network port. If one of the ports is a network port, then the packet is forwarded 270 to its destination. Packets traveling to or from a network port within the private VLAN may always be forwarded. If neither of the two ports is a network port, then it is determined 250 whether at least one port is an isolated port. Packet may not be forwarded between isolated ports. If at least one of the ports is an isolated port, then packet egress is denied 280 (e.g., the packet is blocked, filtered, dropped, etc.).

If neither of the ports are network ports and neither of the ports are isolated ports, it is determined 260 whether both ports are associated with the same non-isolated VLAN. If both ports are associated with the same non-isolated VLAN, then the packet may be 270 forwarded to its destination. If the two ports are associated with separate or different non-isolated VLANs, then packet egress is again denied 280. Per the defined rule, packets to and/or from the same non-isolated VLAN may be forwarded, but packet to and/or from different non-isolated VLANs may not be forwarded.

The process flow described above (e.g., with respect to FIG. 2) for determining port type and/or privacy level can follow various modified orders in different embodiments. For example, the privacy bits described herein may directly dictate a forwarding decision.

Elements of embodiments may also be provided as a machine-readable storage medium for storing the machine-executable instructions. The machine-readable storage medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program which may be transferred from a memory on a remote computer (e.g., a server) to a memory on a requesting computer (e.g., a client).

Various components described herein may be a means for performing the functions described herein. Each component described herein includes software, hardware, firmware or a combination of these. The operations and functions described herein can be implemented as software modules, hardware modules, special-purpose hardware (e.g., application specific hardware, application specific integrated circuits (ASICs), digital signal processors (DSPs), etc.), embedded controllers, hardwired circuitry, etc.

Aside from what is described herein, various modifications may be made to the disclosed embodiments and implementations of the invention without departing from their scope. Therefore, the illustrations and examples herein should be construed in an illustrative, and not a restrictive sense.

What is claimed is:

1. A network switch having a private domain, the network switch comprising:
    a memory to store a single common hardware-based forwarding table for all forwarding entries for all ports and for all types of virtual local area networks (VLANs) in the private domain, wherein the single common hardware-based forwarding table includes entries for privacy levels corresponding to each port in the private domain, and wherein the entries for the privacy levels in the single common hardware-based forwarding table indicate a type of virtual local area network (VLAN) from among a plurality of types of VLANs comprising:
    a network VLAN;
    an isolated subscriber VLAN;
    a non-isolated subscriber VLAN; and
    a VLAN not belonging to the private domain; and
    a network processor having a processing logic to compare a privacy level corresponding to a packet received at any one of the ports in the private domain of the network switch with a privacy level in the single common hardware-based forwarding table corresponding to a forwarding entry associated with the port that received the packet,
    wherein the network processor is operable to forward the packet or to deny the packet from being forwarded in the private domain of the network switch in response to the comparing.

2. The network switch of claim 1, wherein the private domain is a private VLAN.

3. The network switch of claim 1, wherein the network processor further comprises an egress gatekeeper to:
    receive a packet from an isolated port in the private domain of the network switch;
    determine an egress port privacy level for the packet;
    deny forwarding of the packet in the private domain of the network switch when the egress port privacy level indicates that the egress port is an isolated port in the private domain; and
    allow forwarding of the packet in the private domain of the network switch when the egress port privacy level indicates that the egress port is a network port in the private domain.

4. The network switch of claim 1, wherein the privacy level in each entry in the hardware-based forwarding table is determined by two privacy bits.

5. The network switch of claim 4, wherein the two privacy bits indicate the entry is associated with one of the following:
    a network VLAN;
    an isolated subscriber VLAN;
    a non-isolated subscriber VLAN; and
    a VLAN not belonging to the private domain.

6. The network switch of claim 4, wherein the two privacy bits are for an ingress port and an egress port associated with the type of VLAN.

7. The network switch of claim 1, further comprising:
    a plurality of non-isolated subscriber ports in the private domain of the network switch,
    wherein the network processor is further operable to:
        receive a packet from a non-isolated subscriber port of the plurality of non-isolated subscriber ports;
        determine an egress port privacy level for the packet;
        deny forwarding of the packet in the private domain of the network switch when the egress port privacy level indicates that the egress port is an isolated port; and
        allow forwarding of the packet in the private domain of the network switch when the egress port privacy level indicates that the egress port is a network port or a non-isolated subscriber port.

8. The network switch of claim 1, further comprising:
    a plurality of non-isolated subscriber ports with a corresponding VLAN, the plurality of non-isolated subscriber ports in the private domain of the network switch,
    wherein the network processor is further operable to:
        receive a packet from a non-isolated subscriber port of the plurality of non-isolated subscriber ports, the non-isolated subscriber port having a corresponding first VLAN;
        determine an egress port privacy level for the packet received by the non-isolated subscriber port;
        deny forwarding of the packet in the private domain of the network switch when the egress port privacy level indicates that the egress port is a non-isolated port having a corresponding second VLAN, wherein the first VLAN is different from the second VLAN; and
        allow forwarding of the packet in the private domain of the network switch when the egress port privacy level indicates that the egress port is a network port.

9. A computer-implemented method, the method comprising:
    receiving a packet at an ingress port of a network switch, the ingress port belonging to a private virtual local area network (PVLAN) domain, the packet having privacy level information;
    determining a privacy level of the ingress port within the PVLAN based at least on a source virtual local area network (VLAN) associated with the ingress port;
    determining an egress port for the packet from the network switch based at least on a destination address for the packet, the egress port belonging to the PVLAN domain;

determining a privacy level of the egress port within the PVLAN based at least on a destination VLAN associated with the egress port;

comparing by a network processor the privacy level of the ingress port and the privacy level of egress port with corresponding privacy levels stored in a single common hardware-based forwarding table in a memory, wherein the single common hardware-based forwarding table includes:

all forwarding entries for all ports and for all types of virtual local area networks in the PVLAN, and entries for privacy levels corresponding to each port in the PVLAN; and determining whether to forward the packet or to deny the packet from being forwarded in the network switch in response to comparing the privacy levels of the ingress port and the egress port, wherein the entries for the privacy levels in the single common hardware-based forwarding table indicate a type of VLAN from among a plurality of types of VLANs comprising:

a network VLAN;
an isolated subscriber VLAN;
a non-isolated subscriber VLAN; and
a VLAN not belonging to the private domain.

10. The computer-implemented method of claim 9 further comprising:

forwarding the packet on the egress port when the privacy levels indicates the egress port or the ingress port is a network port.

11. The computer-implemented method of claim 9 further comprising:

forwarding the packet on the egress port when the privacy levels indicate both the egress port and the ingress port belong to a matching non-isolated VLAN within the PVLAN domain.

12. The computer-implemented method of claim 9 further comprising:

denying egress of the packet on the egress port when the privacy levels indicate that the ingress port belongs to an isolated VLAN within the PVLAN domain and the egress port belongs to an isolated VLAN or a non-isolated VLAN within the PVLAN domain.

13. The computer-implemented method of claim 9 further comprising:

denying egress of the packet on the egress port when the privacy levels indicate that the egress port belongs to an isolated VLAN within the PVLAN domain and the ingress port belongs to an isolated VLAN or a non-isolated VLAN within the PVLAN domain.

14. A computer-readable non-transitory storage medium containing instructions that, when executed, cause a computer to:

receive a packet at an ingress port of a network switch, the ingress port belonging to a private virtual local area network (PVLAN) domain, the packet having privacy level information;

determine a privacy level of the ingress port within the PVLAN based at least on a source virtual local area network (VLAN) associated with the ingress port;

determine an egress port for the packet from the network switch based at least on a destination address for the packet, the egress port belonging to the PVLAN domain;

determine a privacy level of the egress port within the PVLAN based at least on a destination VLAN associated with the egress port;

compare by a network processor the privacy level of the ingress port and the privacy level of egress port with corresponding privacy levels stored in a single common hardware-based forwarding table in a memory, wherein the single common hardware-based forwarding table includes:

all forwarding entries for all ports and for all types of virtual local area networks in the PVLAN, and entries for privacy levels corresponding to each port in the PVLAN; and determine whether to forward the packet or to deny the packet from being forwarded in the network switch in response to comparing the privacy levels of the ingress port and the egress port, wherein the entries for the privacy levels in the single common hardware-based forwarding table indicate a type of VLAN from among a plurality of types of VLANs comprising:

a network VLAN;
an isolated subscriber VLAN;
a non-isolated subscriber VLAN; and
a VLAN not belonging to the private domain.

15. The computer-readable non-transitory storage medium of claim 14 having further instructions that when executed cause the computer to:

forward the packet on the egress port when at least one of the privacy levels indicates the egress port or the ingress port is a network port.

16. The computer-readable non-transitory storage medium of claim 14 having further instructions that when executed cause the computer to:

forward the packet on the egress port when the privacy levels indicate both the egress port and the ingress port belong to a matching non-isolated VLAN within the PVLAN domain.

17. The computer-readable non-transitory storage medium of claim 14 having further instructions that when executed cause computer to:

deny egress of the packet on the egress port if the privacy levels indicate that the ingress port belongs to an isolated VLAN within the PVLAN domain and the egress port belongs to an isolated VLAN or a non-isolated VLAN within the PVLAN domain.

18. The computer-readable non-transitory storage medium of claim 12 having further instructions that when executed cause the computer to:

deny egress of the packet on the egress port when the privacy levels indicate that the egress port belongs to an isolated VLAN within the PVLAN domain and the ingress port belongs to an isolated VLAN or a non-isolated VLAN within the PVLAN domain.

19. The network switch of claim 1 further comprising:

a plurality of ports in the private domain including:
isolated ports each of which is associated with a corresponding isolated VLAN;
non-isolated ports each of which is associated with a corresponding non-isolated VLAN; and
a network port for connecting to a network.

* * * * *